United States Patent [19]
Bottum

[11] Patent Number: 4,941,864
[45] Date of Patent: Jul. 17, 1990

[54] CLUTCHABLE PULLEY SYSTEM SANS IDLER-PULLEY

[75] Inventor: Robert O. Bottum, Lincoln, Nebr.

[73] Assignee: Exmark Manufacturing Company Incorporated, Beatrice, Nebr.

[21] Appl. No.: 413,099

[22] Filed: Sep. 27, 1989

[51] Int. Cl.⁵ ............................................. F16H 7/08
[52] U.S. Cl. .................................... 474/133; 474/84; 474/113
[58] Field of Search ........ 474/101, 109, 111, 113–117, 474/133–138, 84–89

[56] References Cited

U.S. PATENT DOCUMENTS

| | | | |
|---|---|---|---|
| 3,216,266 | 11/1965 | Sunnen | 474/134 X |
| 3,362,243 | 1/1968 | Ferguson | 474/113 |
| 3,741,499 | 6/1973 | Osborn | 474/133 X |
| 4,036,029 | 7/1977 | Francis | 474/113 X |
| 4,223,757 | 9/1980 | Olander | 474/113 X |

Primary Examiner—Thuy M. Bui
Attorney, Agent, or Firm—George R. Nimmer

[57] ABSTRACT

Disclosed is a clutchable pulley system conventionally having an annular first-belt and an annular second-belt, both belts enveloping a plurally-grooved transfer pulley. Also in conventional fashion; the first-belt is constantly tightly trained with a power-source pulley and at least one primary-load pulley; and the second-belt is normally loosely enveloping the plurally-grooved transfer pulley and at lest one secondary-load pulley whereby the secondary-load pulley(s) will not rotate until the second-belt is made to tightly train with the transfer pulley. Departing from the prior art utilization of the idler-pulley principle for controllably tightly entraining the second-belt with the plurally-grooved and secondary-load pulleys, the herein disclosed clutchable pulley system supplants the second-belt idler-pulley by controllably moving the plurally-grooved transfer pulley along an arcuate path.

6 Claims, 2 Drawing Sheets

CLUTCHABLE PULLEY SYSTEM SANS IDLER-PULLEY

BACKGROUND OF THE INVENTION

Drawing FIG. 1 schematically indicates a prior art clutchable pulley system (10) that conventionally utilizes idler-pulleys (e.g. 14, 19). An idler-pulley (19) is employed for intermittently frictionally entraining an annular second-belt (18) about the second-groove (13N) of a plurally-grooved transfer pulley (13) whereby one or more secondary-load pulleys (16, 17, etc.) will become rotated from an annular first-belt (15) that is constantly driven by a power-source pulley (11). First-belt 15 is normally constantly frictionally trained about other pulleys having spatially fixed and mutually parallel axial shafts including: said power-source pulley 11 (having axial shaft 11A); at least one primary-load pulley (e.g. 12 having axial shaft 12A); and a first-groove 13M of transfer pulley 13 (having axial shaft 13A). Though the circumferential grooves (e.g. 13M, 13N) of such plurally-grooved transfer pulleys are usually spaced the same radial distance from its axial shaft (13A), for purposes of graphical clarity, the groove 13N for second-belt 18 is shown radially outwardly from the first-belt groove 13M. Second-belt 18, which is parallel to and herein behind first-belt 15, is normally loosely trained about the aggregate of: said transfer pulley 13 (e.g. at 13N); and one or more secondary-load pulleys (e.g. 16, 17, etc.). The secondary-pulleys have spatially fixed and mutually parallel axial shafts (e.g. 16A, 17A, etc.).

For such prior art systems (e.g. 10), controllable intermittent engagement of the second-belt (18) with the plurally-grooved pulley (13 at 13N) is conventionally accomplished by an idler-pulley (19) which is movable against the second-belt (18), as indicated by phantom arrow in FIG. 1. However, utilization of idler-pulleys (e.g. 19) for intermittently effecting engagement of a second-belt (e.g. 18) with a plurally-grooved transfer pulley and its associated secondary-load pulleys is fraught with serious disadvantages. For example, such utilization of idler-pulleys in intermittent abrupt contacts with the second-belt causes chafing, stretching, backside bending, belt cord wear, and other inimical stresses that seriously diminish belt life. Moreover, utilization of idler-pulleys requires substantial extra space for the clutchable pulley system that cannot be tolerated in certain space constraint situations e.g. within riding lawn mowers, etc.

OBJECTIVE OF THE INVENTION

In view of the aforementioned and other disadvantages and deficiencies of clutchable pulley systems of the idler-pulley type, it is the general objective of the present invention to provide clutchable pulley systems that are not dependent upon utilization of the idler-pulley principle for controllably intermittently engaging the annular second-belt with the plurally-grooved transfer pulley.

GENERAL STATEMENT OF THE INVENTION

With the above general objective in view, and together with other ancillary and related objectives which will become more apparent as this description proceeds, the improved clutchable pulley system of the present invention eschews utilization of the idler-pulley principle for intermittently engaging the normally slack second-belt with the plurally-grooved transfer pulley but instead accomplishes the same result by employing an actuatable lever for controllably moving the transfer pulley along an arcuate path and accompanied by a modest resilient urging of the transfer pulley in the appropriate direction.

BRIEF DESCRIPTION OF THE DRAWING

In the drawing, wherein like characters refer to like parts in the several views, and in which:

FIG. 2 is analagous to FIG. 1 although differing therefrom in that the prior art idler-pulley is supplanted by having the plurally-grooved transfer pulley movable along an arcuate path (AP);

DETAILED DESCRIPTION OF THE DRAWING

Figure 1:
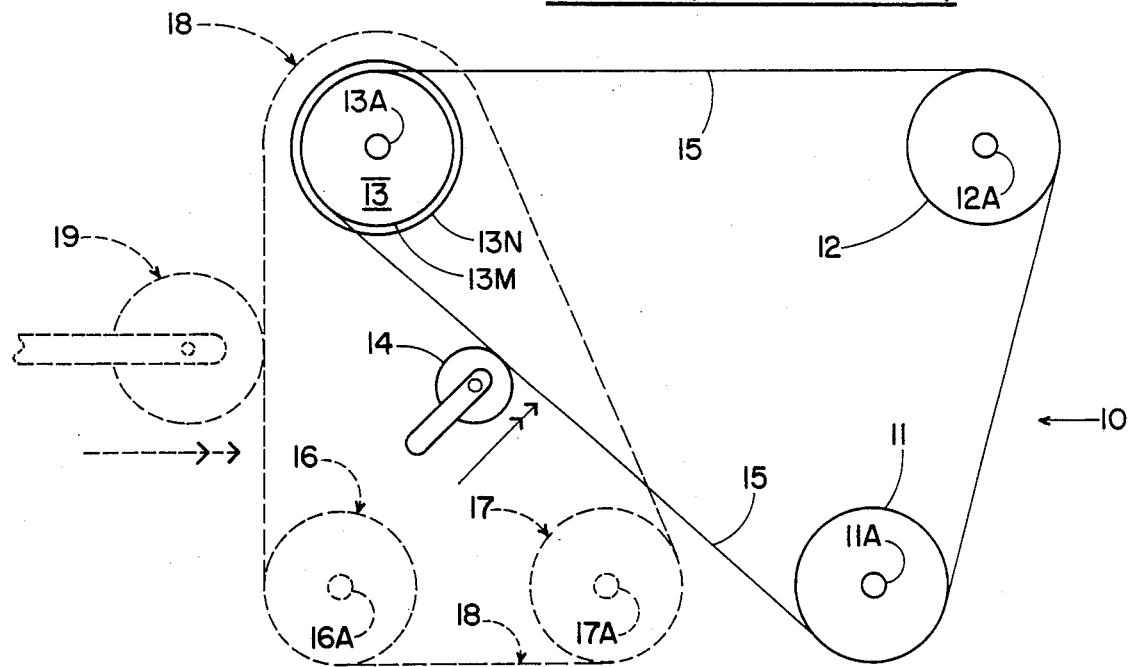
FIG. 1, aforedescribed, is a schematic view of a typical idler-type clutchable pulley system of the prior art.
Figure 2:
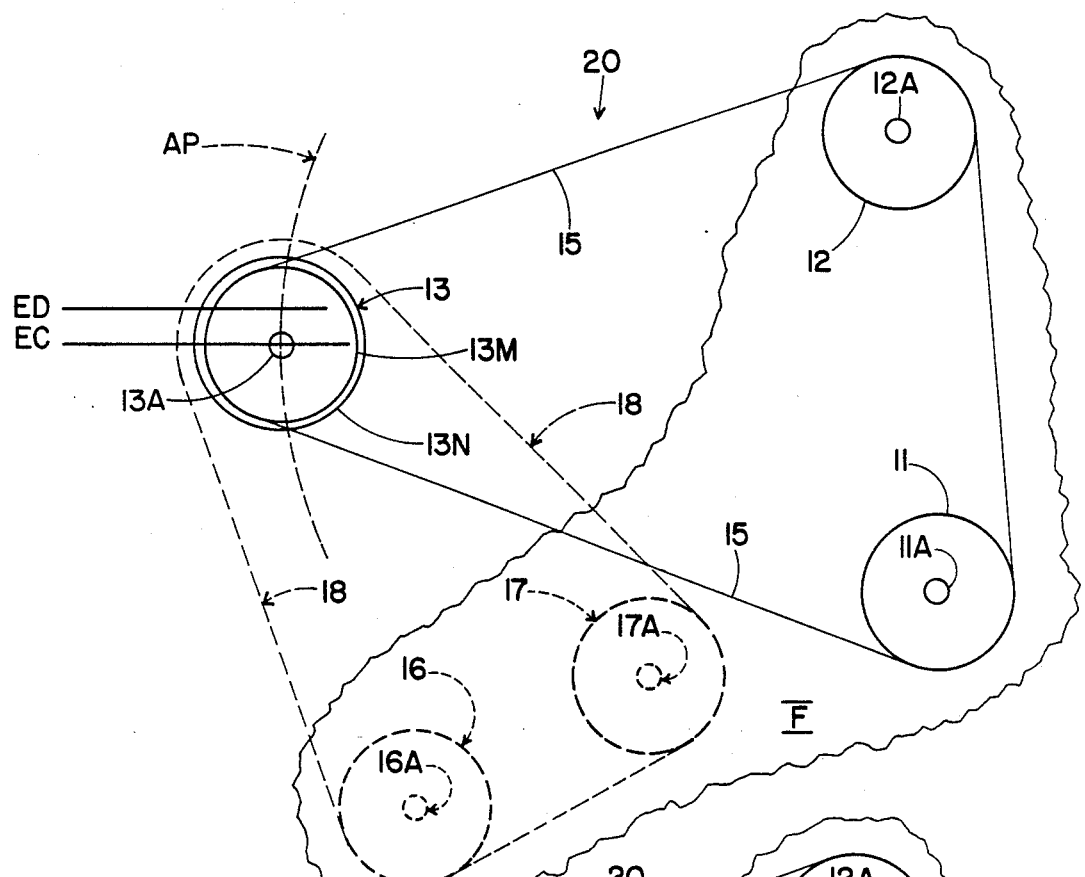
FIG. 2 is a schematic view of a representative embodiment (20) of the "clutchable pulley system sans idler-pulley" of the present invention.

As seen in drawing FIG. 2, it is readily apparent that the FIG. 2 representative embodiment 20 of the "clutchable pulley system sans idler-pulley" retains the following structural features (i–vi) from the prior art idler-pulley type pulley system 10 alluded to in FIG. 1. These structural features (i–vi), which are retained from the prior art, include:

(i) a power-source pulley (11) revolvably surrounding an axial shaft (11A) therefor, said shaft being spatially fixed with reference to a framework (F);

(ii) at least one primary-load pulley (12) revolvably surrounding an axial shaft (12A) therefore, said shaft being spatially fixed with reference to said framework (F) and being substantially co-parallel to the axial shaft (11A) of the power-source pulley (11);

(iii) a plurally-grooved transfer pulley (13) revolvably surrounding an axial shaft (13A) therefor, said shaft being substantially co-parallel to the axial shafts (11A, 12A) of the power-source and primary-load pulleys (11, 12);

(iv) an annular first-belt 15 having a substantially dimensionally constant annular first-length, said first-belt being constantly frictionally trained with said power-source pulley (11), with said primary-load pulley (12), and with a circumferential first-groove (13M) of the transfer pulley;

(v) at least one secondary-load pulley (e.g. 16, 17) and respectively revolvably surrounding an axial shaft (16A, 17A) therefor, said shafts being spatially fixed with reference to said framework (F) and being substantially co-parallel to the axial shafts (e.g. 11A, 12A, 13A) of said power-source, primary-load, and transfer pulleys; and (vi) an annular second-belt 18 having a substantially dimensionally constant annular second-length that normally loosely envelops said secondary-load pulleys (16, 17) and the circumferential second-groove (13N) of the transfer pulley.

On the other hand, it is readily apparent from FIG. 2 that the clutchable pulley system (e.g. 20) of the present invention differs from the FIG. 1 prior art in that idler-pulleys (e.g. 14, 19) are supplanted by having the transfer pulley axis (13A) spatially unrestrained by the framework (F) and by having the transfer pulley axis (13A) controllably movable along an arcuate path AP that extends concavely toward the power-source and primary-load pulleys (11, 12).

Thus, it is apparent from FIG. 2: When the transfer pulley axial shaft (13A) is at a first-position (EC) along arcuate path AP, first-belt 15 is constantly frictionally trained with the power-source pulley 11, with the at least one primary-load pulley 12, and with the circumferential first-groove 13M of transfer pulley 13. And at said pulley shaft first-position EC, the second-belt (18) loosely envelopes (i.e. is not frictionally trained with) the aggregate of secondary-pulleys (16, 17) and transfer pulley second-groove 13N. In other words, for the drawing FIG. 2 shaft position 13A-EC along arcuate path AP: The continuously frictionally trained first-belt 15 (which is actuated from power-source pulley 11) will cause rotation of primary-load pulley 12 and transfer pulley 13. And, the slack condition second-belt 18 will not be driven by transfer pulley 13, whereby the secondary-load pulleys 16 and 17 remain in non-rotating condition.

Figure 3:
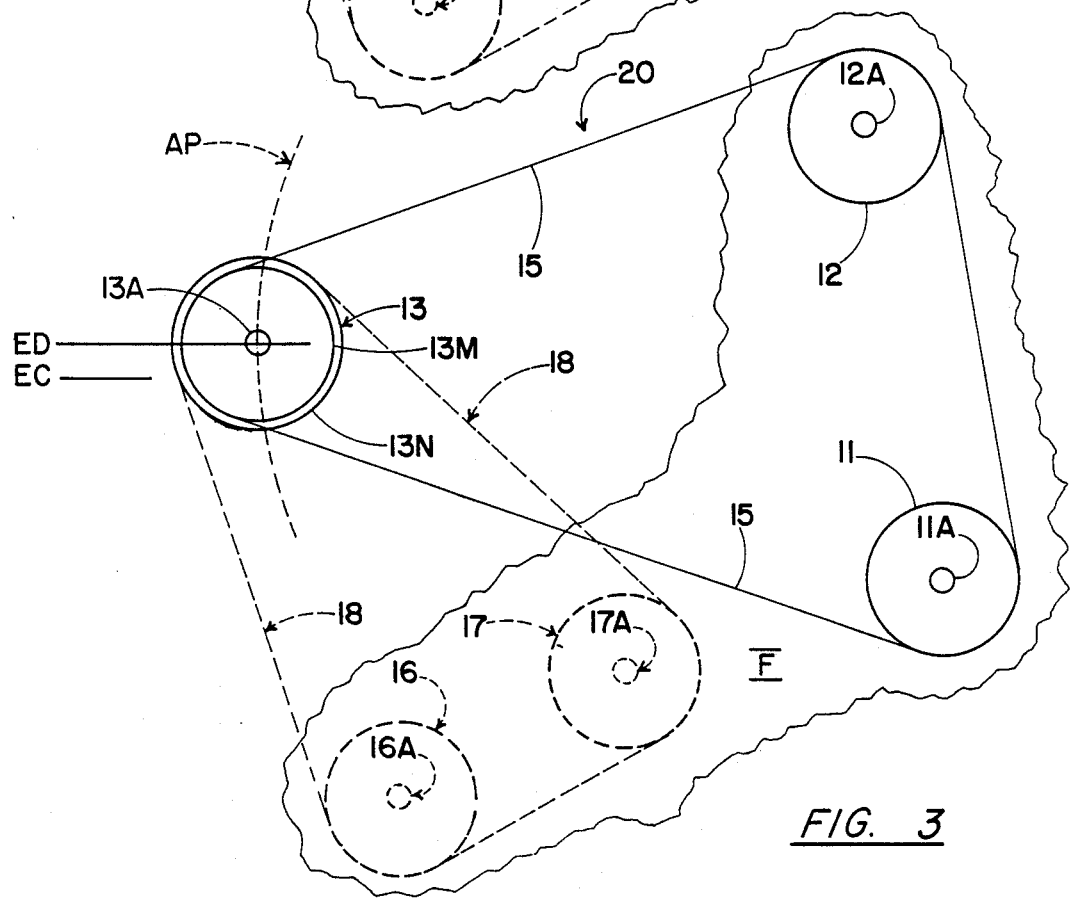
FIG. 3 is a schematic view of the FIG. 2 representative embodiment and differing therefrom in that the plurally-grooved transfer pulley has been move along the arcuate path (AP) to a second-position (ED) that enables the second-belt to join the first-belt into affirmative engagement with the transfer pulley.

As previously mentioned, FIG. 3 is a schematic view of the FIG. 2 representative embodiment 20 but differing from FIG. 2 in that the transfer pulley shaft 13A has been moved along arcuate path AP to a second-position ED that enables second-belt 18 to join first-belt 15 into affirmative frictional engagement with plurally-grooved transfer pulley 13. At this FIG. 3 condition (ED at AP) for transfer pulley shaft 13A: First-belt 15 remains frictionally trained about power-source pulley 11, primary-load pulley 12, and transfer pulley first-groove 13M whereby transfer pulley 13 continues to rotate. And, second-belt 18 has become frictionally trained about the aggregate of secondary-load pulleys (16, 17) and transfer pulley second-groove 13N whereby the power-source pulley 11 causes simultaneous rotation of the primary-load and secondary-load pulleys.

Figure 4:
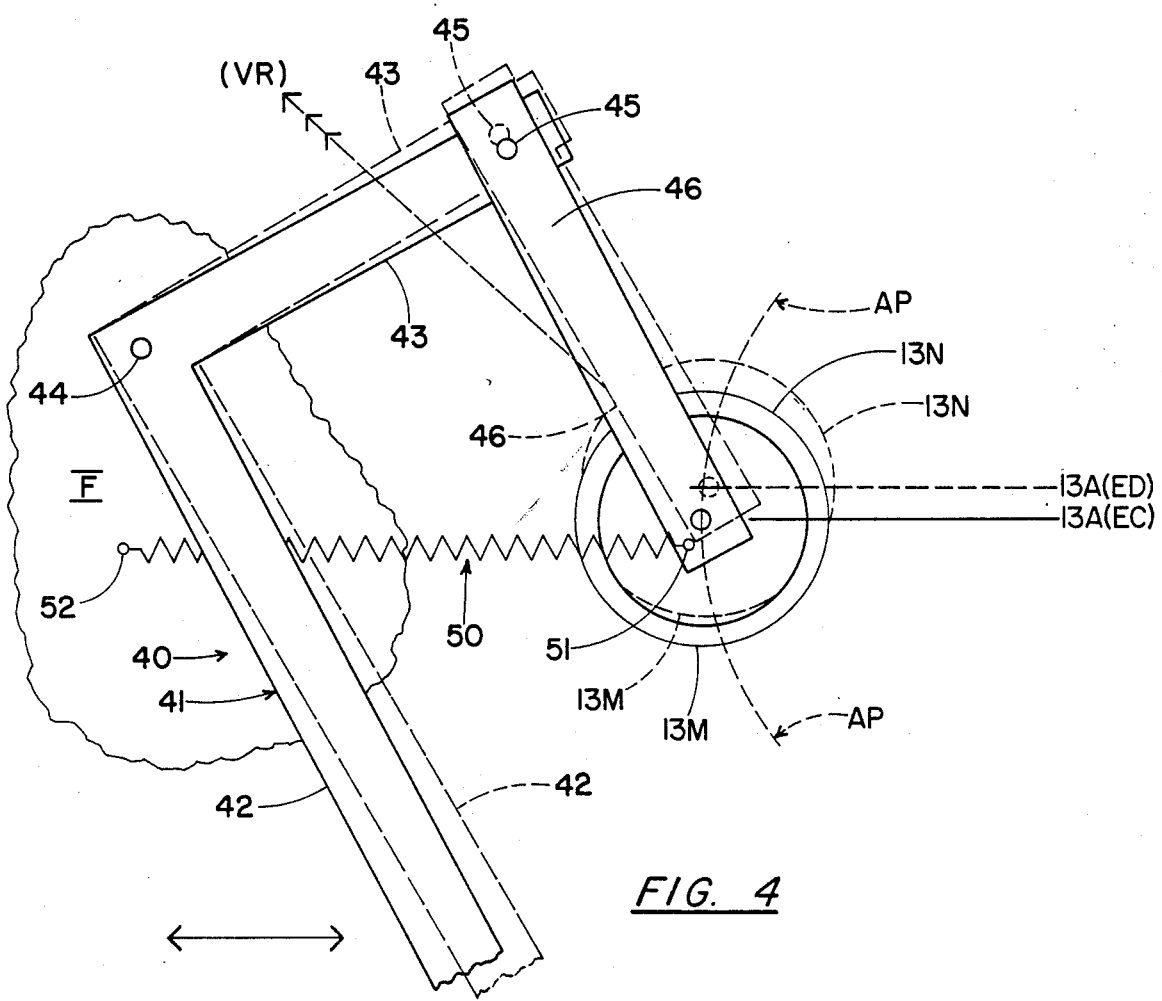
FIG. 4 is a detail view of the FIGS. 2 and 3 representative embodiment (20) and specifically directed to lever means and spring means employed for positioning the transfer pulley along the arcuate path AP.

Drawing FIG. 4 is directed to a representative transfer pulley control means (e.g. 40, 50) for controllably moving the transfer pulley axial shaft (13A) between two critical locations (EC, ED) along said intended arcuate path AP. As previously alluded to: At shaft first-position EC, second-belt 18 loosely envelops (i.e. is not frictionally trained with) the aggregate of secondary-load pulleys 16–17 and of transfer pulley second-groove 13N. But upon attainment of second-position ED, second-belt 18 has become frictionally trained with said pulleys aggregation whereby power-source pulley 11 causes simultaneous rotation of the primary-load and secondary-load pulleys.

A lever means component (e.g. 40) of the transfer pulley control means comprises a rigidly angular and actuatable main-link 41 and a pivotal-link 46. Main-link 41, which confronts the convex side of arcuate path AP, herein comprises a lengthier arm 42 and a shorter arm 43; at the angular juncture of arms 42 and 43, main-link 41 is pivotably connected at a first-pivot 44 to a framework (F). As indicated by the double-headed arrow and respective phantom lines in FIG. 4, main-link 41 is pivotably motivatable at its lengthier arm 42. At a second-pivot 45 located at main-link shorter arm 43, pivotal-link 46 extends below arm 43 whereat pivotal-link 46 revolvably supports transfer pulley 13 (e.g. for example, by journalling axial shaft 13A). Accordingly, pivotal actuation of main-link 41 in turn causes pivoting of pivotal-link 46 which exerts a link-force therealong that tends to cause transfer pulley shaft 13 to move along arcuate path AP.

A resilient spring means component (e.g. 50) of the transfer pulley shaft control means has a spring-force acting in concert with said lever link-force. The vectorial resultant-force (indicated by triple-headed arrow) of said spring-force and said link-force ensures:

(a) at the transfer pulley shaft first-position (13A-EC), that first-belt 15 is maintained in tension at transfer pulley 13 (and also frictionally trained with pulleys 11 and 12); and (b) at the transfer pulley second-position (13A-ED), first-belt 15 and second-belt are both maintained in tension at transfer pulley grooves 13M and 13N, respectively, whereby said belts are respectively frictionally trained with pulleys 11–12 and 16–17.

A representative resilient means component comprises an elongate helical spring 50 having an endward first-region 51 attached to pivotal-link 46 and having an endward second-region 52 attached to a framework (F) adjacent main-link 42. Alternatively, the helical spring first-region might be attached directly to the transfer pulley axial shaft (13A).

From the foregoing, the construction and operation of the clutchable pulley system sans idler-pulley will be readily understood and further explanation is believed to be unnecessary. However, since numerous modifications and changes will readily occur to those skilled in the art, it is not desired to limit the invention to the exact construction shown and described, but rather the appended claims indicate the scope of the invention.

What is claimed is as follows:

1. Clutchable pulley system mounted to a framework, said pulley system comprising:

(A) a power-source pulley revolvably surrounding an axial shaft therefor that is spatially fixed at said framework;

(B) at least one primary-load pulley revolvably surrounding an axial shaft therefor that is spatially fixed at said framework, said axial shaft being substantially co-parallel to the axial shaft of said power-source pulley;

(C) a plurally-grooved transfer pulley revolvably surrounding an axial shaft therefor that is maintained in substantial co-parallelism with the axial shafts for said power-source and primary-load pulleys, said transfer pulley axial shaft lacking a spatially fixed relationship with said framework and being movable along an arcuate-path that extends concavely toward said power-source and primary-load pulleys;

(D) an annular first-belt having a first-length, said first-belt being constantly frictionally trained with said power-source pulley, said at least one primary-load pulley, and to a circumferential first-groove of said plurally-grooved transfer pulley;

(E) at least one secondary-load pulley, each revolvably surrounding an axial shaft therefor that is spatially fixed at said framework, said axial shaft being substantially co-parallel to the axial shafts for said power-source and primary-load pulleys;

(F) an annular second-belt having a second-length, said secondary-belt being substantially co-parallel with said first-belt and encircling the aggregate of: said at least one secondary-load pulley and a circumferential second-groove of said plurally-grooved transfer pulley; and (G) transfer pulley shaft control means for controllably moving said transfer pulley shaft between at least two positions along said arcuate-path, one of said two positions being a shaft first-position wherein the secondary-belt is not frictionally engaged with the said pulleys aggregate and the second of said two positions being a shaft second-position wherein the secondary-belt is frictionally engaged with the said pulleys aggregation.

2. The clutchable pulley system of claim 1 wherein said transfer pulley shaft control means comprises lever means including:

(a) a rigidly angular and actuatable main-link pivotably connected at a lever means primary-pivot to said framework; and (b) a pivotal-link pivotably connected at a second-pivot to said main-link and also revolvably supporting said transfer pulley; whereby as said main-link is actuatably pivoted at said primary-pivot, the pivotal-link exerts a link-force tending to cause the transfer pulley shaft to move from said first-position to said second-position.

3. The clutchable pulley system of claim 2 wherein there is resilient spring means having a spring-force acting in concert with said link-force and together directionally exhibiting a vectorial resultant-force tending to maintain the first-belt and the secondary-belt in tension at the transfer pulley.

4. The clutchable pulley system of claim 3 wherein the lever means pivotal-link journals the transfer pulley shaft.

5. The clutchable pulley system of claim 4 wherein the spring means comprises an elongate helical spring having a first-region attached to said pivotal-link and having a second-region attached to said framework.

6. The clutchable pulley system of claim 4 wherein the spring means comprises an elongate helical spring having a first-region attached to the transfer pulley shaft and having a second-region attached to said framework.

* * * * *